US005598762A

United States Patent [19]

Sneddon

[11] Patent Number: 5,598,762
[45] Date of Patent: Feb. 4, 1997

[54] FLUID STORAGE TANK EMPLOYING AN ISOLATION SEAL

[75] Inventor: Kirk Sneddon, Sayville, N.Y.

[73] Assignee: Arde Inc., Norwood, N.J.

[21] Appl. No.: 509,568

[22] Filed: Jul. 31, 1995

[51] Int. Cl.$^6$ ........................................................ F16J 9/00
[52] U.S. Cl. ............................. 92/192; 92/172; 222/386; 60/259
[58] Field of Search .................................. 92/192, 169.1, 92/172; 60/259, 39.48; 222/386, 389

[56] References Cited

U.S. PATENT DOCUMENTS

| | | | |
|---|---|---|---|
| 4,048,905 | 9/1977 | Souslin | 92/85 B |
| 4,538,749 | 9/1985 | Rosman et al. | 60/39.48 |
| 5,042,365 | 8/1991 | Rosman | 92/192 |
| 5,385,081 | 1/1995 | Sneddon | 92/192 |

*Primary Examiner*—Thomas E. Denion
*Attorney, Agent, or Firm*—Sofer & Haroun, LLP

[57] ABSTRACT

A fluid storage tank utilizing an isolation seal in which a leak proof isolation seal covers the entire head of the piston of the storage tank requiring only a single fluid tight seam to seal off the fluid storage chamber from the remainder of the storage tank. The isolation seal has a circumferential notch located proximate to its outer periphery which permits the isolation seal to rupture along a predetermined path. Elastomeric annular seals on the piston provide a dynamic seal to prevent the fluid from leaking while the piston is moving to eject the stored fluid. The isolation seal is welded or otherwise fastened to the interior surface of the tank at a location behind the elastomeric seals so that the latter need not pass over the weld during movement of the piston. The interior of the tank has a first or larger diameter section, a second or smaller diameter section, and a tapered transition section which is disposed therebetween just past the rupture zone of the isolation seal. The larger diameter section enables the first annular seal to clear the jagged edges of the ruptured isolation seal. The first annular seal does not establish tight fitting, sealing contact with the interior of the tank until just before it reaches the second diameter section. The second annular seals spaced sufficiently behind the first annular seal to ensure that an interim seal is provided until the first annular seal reaches the second diameter section.

12 Claims, 4 Drawing Sheets

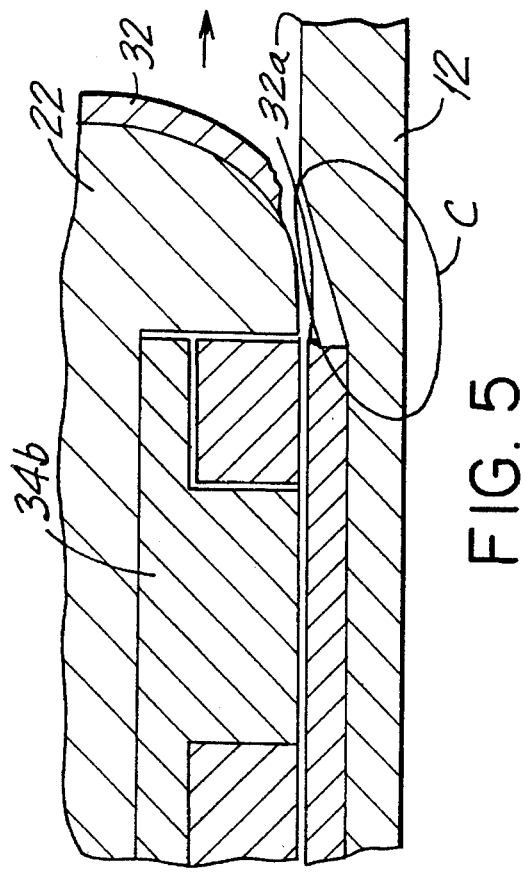
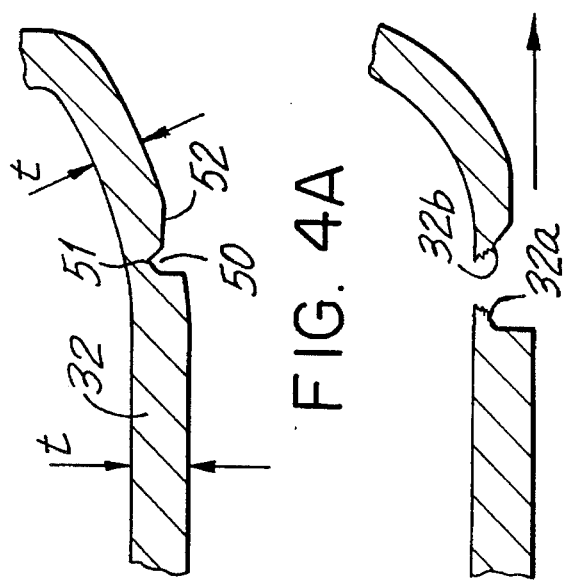
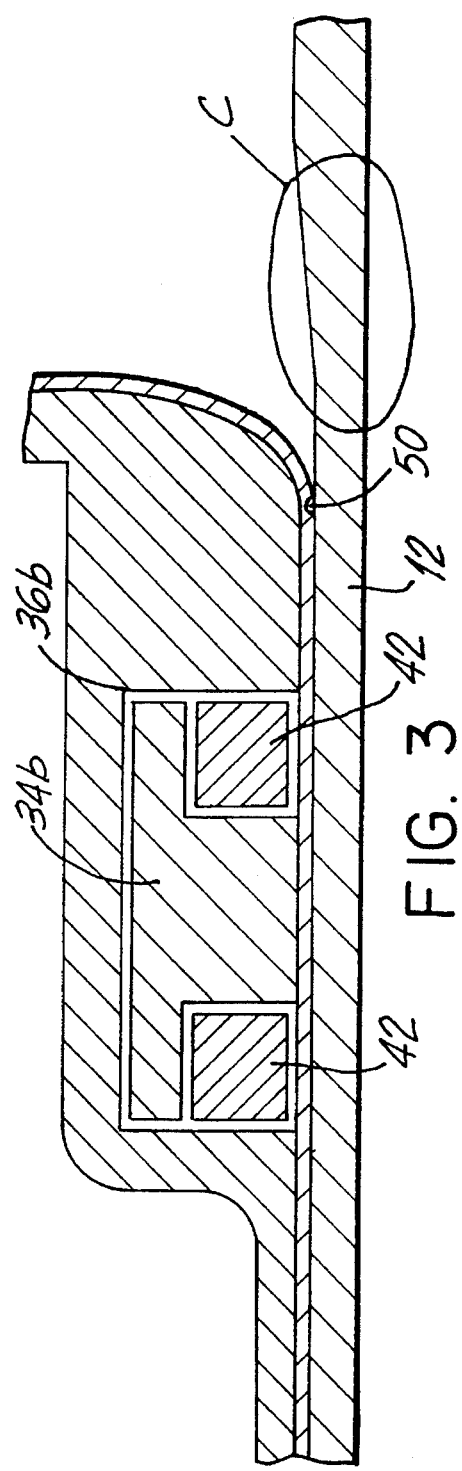

FLUID STORAGE TANK EMPLOYING AN ISOLATION SEAL

BACKGROUND OF THE INVENTION

1. Field of the Invention

The present invention relates to fluid storage tanks that employ both dynamic and isolation seals and, particularly, to fluid storage tanks in which the isolation seal ruptures during system actuation without causing damage to the dynamic seals.

2. Description of the Background Art

One of the main sources of fuel for the engines of rockets and missiles is propellant fuel which is in the form of a liquid. This propellant is typically a liquid or gel, possibly with suspended solids, and is stored in cylindrical storage tanks located within the body of the rocket or missile. A piston slidably disposed within the storage tank maintains the pressure of the liquid fuel in the tank storage as liquid propellant is forcibly expelled from the tank through an appropriately located orifice. Another fluid, and most typically a gas, causes the piston to slide within the tank, thereby pressurizing the propellant or, alternatively, expelling the liquid fuel from the tank.

Since the liquid propellant may have to remain in its storage tank for many years before it is used, steps must be taken to ensure that the liquid propellant does not seep past the piston. Seepage of liquid propellant from the storage chamber of the tank into other portions of the rocket results in a loss of propellant and, thus, reduces the range of the rocket. Moreover, seeping propellant may allow propellant mixing causing ignition of the propellant outside of the combustion resulting in explosion or damage to other rocket propulsion components due to long term exposure because the propellant is extremely caustic.

A variety of design features have been employed to prevent the leakage of propellant as the piston moves within the storage tank. For example, elastomeric sealing rings are typically used to provide a dynamic seal between the piston surface and the interior surface of the storage tank as the piston moves within the storage tank. Disadvantageously, the materials from which such elastomeric seals are made can degrade rapidly while exposed to the liquid propellant. In time, proper operation of the piston and the rocket may be jeopardized.

In U.S. Pat. No. 5,042,365, there is disclosed an arrangement in which an annular shear seal is mounted within a storage tank about the outer circumference of the piston so that it also contacts the inner surface of the wall of the storage tank. The annular shear seal is structurally sealed, such as by welding or other bonding means, along its central opening to the outside surface of the piston and along its outer circumference to the inner surface of the wall of the storage tank. The annular shear seal is disclosed as having a notch portion which is positioned on the shear seal between the point where the shear seal contacts the piston and the point where the shear seal contacts the storage tank wall. The shear seal and its two welds block leakage of the propellant before the rocket is activated. When the rocket is to be activated, fluid pressure is applied to the piston, which causes the piston to exert an increasing force to the shear seal until a point when the shear seal ruptures along its notch. When the shear seal ruptures, the piston is free to slide and thereby expel the liquid fuel from the storage chamber of the tank.

Although the disclosed shear seal design aids in preventing leakage of the propellant, the design requires at least two separate welds—one between the piston and the shear seal, and the other between the shear seal and the wall of the storage tank. Since the integrity of these two welds is critical to the proper operation of the storage tank, both of the welds must be inspected prior to final assembly of the tanks. The inspection of these two welds is a relatively time consuming and expensive process in view of the fact that they are located within the narrow confines of the storage rank and must be carried out by using X-ray photography.

Additionally, a shear seal typically does not rupture uniformly along the entire length of its notch due to variations of the notch profile, variations in the depth of the notch, variations in the thickness of the surrounding material, and variations in the metal comprising the shear seal itself and local geometric distortions which are created by elongation of the shear seal material prior to rupture of the seal. As a result, it may be expected that a notched shear seal as disclosed above will not break uniformly, at exactly the same position, and at the same moment along its entire length. Furthermore, for the elastomeric seals to operate properly (i.e., provide a fluid tight seal while not impinging upon the freedom of movement of the piston), the rupture point of a shear seal cannot be recessed too deeply into the wall of the storage tank because the elastomeric seals which have to pass over the recess in which the shear seal is mounted cannot lose wall contact if sealing integrity is to be maintained. As a result, jagged remnants of the shear seal may be expected to remain, protrude, and have been found to tear or score the elastomeric annular seals on the piston. Such tears or scoring of the elastomeric seals allow the propellant to leak around the piston when the piston is activated, thereby possibly causing the piston to malfunction. Remnants of the shear seal may also cause the piston to jam so that all of the propellant cannot be expelled.

U.S. Pat. No. 3,545,343 discloses a design which employs only one weld rather than two or more welds, however, this weld is very deep. In this design, a weld is applied from the outside of the storage tank and passes through the entire wall of the storage tank into a recess in the piston. The weld is disclosed to be thin enough so that it will rupture or shear when the piston begins to move. This design poses problems relating to the formation of a uniform deep weld, and to the evaluation of the integrity of the weld because of its depth. In addition, the design does not protect the elastomeric seals on the piston from getting torn or scored by remnants of the weld after the weld has ruptured.

In an effort to address the above described deficiencies, the inventor herein disclosed in U.S. Pat. No. 5,385,081 assigned to the assignee of the present application, a shear seal and piston arrangement in which the head of the piston, in particular a circumferential shoulder on the outer periphery of the head of the piston, flattens against the wall of the fluid storage tank any protruding portions of the ruptured shear seal, including the jagged edge of the remnant of the shear seal that remains attached to the wall of the storage tank. As a result, the elastomeric seals are not damaged when the piston slides and remnants of the ruptured shear seal will not cause the piston to jam while it slides within the tank.

Although the configuration described in U.S. Pat. No. 5,385,081 does provide substantial protection of the elastomeric seals during movement of the piston, there is still a possibility that the seals may be damaged. The shear seal, which is bonded to the surface of piston proximate the head, is attached to the inner surface of the wall of the storage tank by a single weld located within a recess in the inner surface of the wall of the storage tank. As such, there exists a significant possibility that the elastomeric seals may be damaged or abraded as they pass over the area of the weld.

SUMMARY OF THE INVENTION

According to the present invention, the deficiencies associated with the prior art are avoided by a fluid storage arrangement in which the isolation seal is secured to the vessel at a location behind the dynamic seals. As such, the dynamic seals need not pass over the weld as the piston moves, thereby reducing the risk of tearing the material comprising the dynamic seals and easing the assembly of the vessel by providing significantly improved access to the weld zone.

In accordance with the present invention, the isolation seal covers the entire piston in the storage tank and requires only a single fluid tight seam to seal off the fluid storage chamber from the remainder of the storage tank. The isolation seal has a circumferential notch located proximate to its outer periphery which permits the isolation seal to rupture along a predetermined path by a tensile loading as opposed to shear loading which has been used previously. The tensile initiation of the isolation seal insures that the fixed tank mounted portion of the isolation seal remains in intimate contact with the tank wall. There is no mechanism for generation of a protuberance from the tank wall as exists due to elongation of the shear seal material prior to a shear load induced seal rupture. The intimate contact of the fixed portion of the seal with the tank wall mitigates the potential for dynamic seal damage. Elastomeric annular seals on the piston provide a dynamic seal to prevent the fluid from leaking while the piston is moving to eject the stored fluid. The isolation seal is welded or otherwise fastened to the interior surface of the tank at a location behind the piston so that the piston need not pass over the weld during translation.

The interior of the tank has a first or larger diameter section, a second or smaller diameter section, and a tapered transition section which is disposed therebetween just past the rupture zone of the isolation seal (prior to movement of the piston). The larger diameter section enables installation of the isolation seal between the vessel wall and the piston which may be pre-installed in the isolation seal to ease assembly. The first annular seal does not establish tight fitting, sealing contact with the interior of the tank once it has exited the fixed portion of the isolation seal until just before it reaches the second diameter section. The second annular seal is spaced sufficiently behind the first annular seal to ensure that an interim seal is provided until the first annular seal reaches the second, smaller, diameter section. As is evident, the distance between the two dynamic is greater than the tapered transition section.

The various features of novelty which characterize the invention are pointed out with particularity in the claims annexed to and forming a part of the disclosure. For a better understanding of the invention, its operating advantages, and specific objects attained by its use, reference should be had to the accompanying drawings and descriptive matter in which there are illustrated and described several embodiments of the invention.

BRIEF DESCRIPTION OF THE DRAWINGS

The features and advantages of the present invention will be more readily understood from the following detailed description when read in conjunction with the accompanying drawings, in which:

FIG. 3 is a detailed cross-sectional view of the portion of the isolation seal of the present invention depicted in circle B in FIG. 1;

FIG. 4A is a detailed cross-sectional view depicting a portion of the isolation seal prior to rupture of the same;

FIG. 4B is a detailed cross-sectional view depicting a portion of the isolation seal immediately after rupture of the same;

FIG. 5 is a partial cross-sectional view depicting continued movement of the piston head following rupture of the isolation seal.

DETAILED DESCRIPTION OF THE INVENTION

In the description which follows, like parts are marked throughout the specification and drawings, respectively. The drawings are not necessarily to scale and in some instances, proportions have been exaggerated in order to more clearly depict certain features of the invention.

Figure 1:
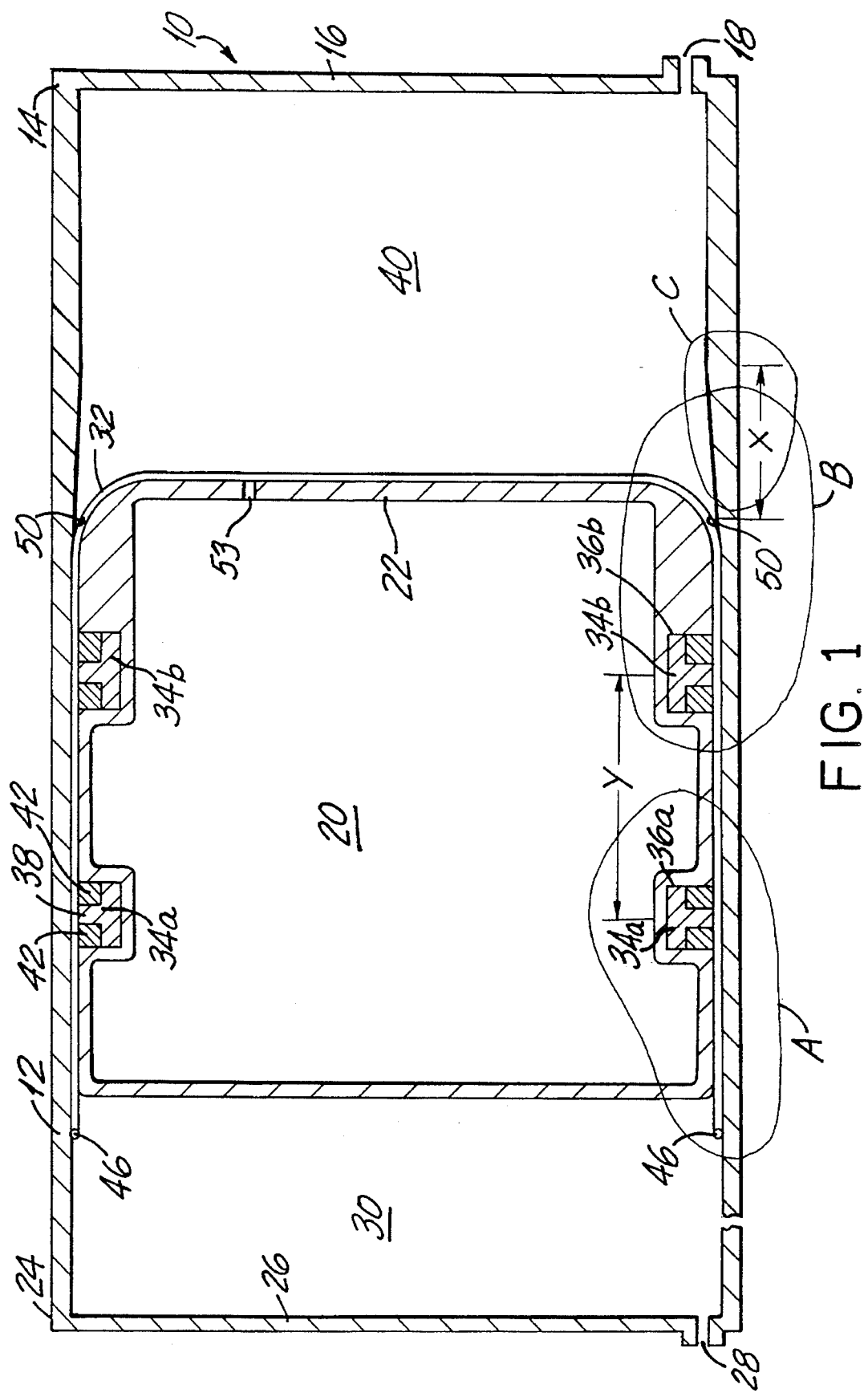
FIG. 1 is a schematic cross-sectional view of an illustrative propellant storage tank employing the isolation seal of the present invention.
Figure 2:
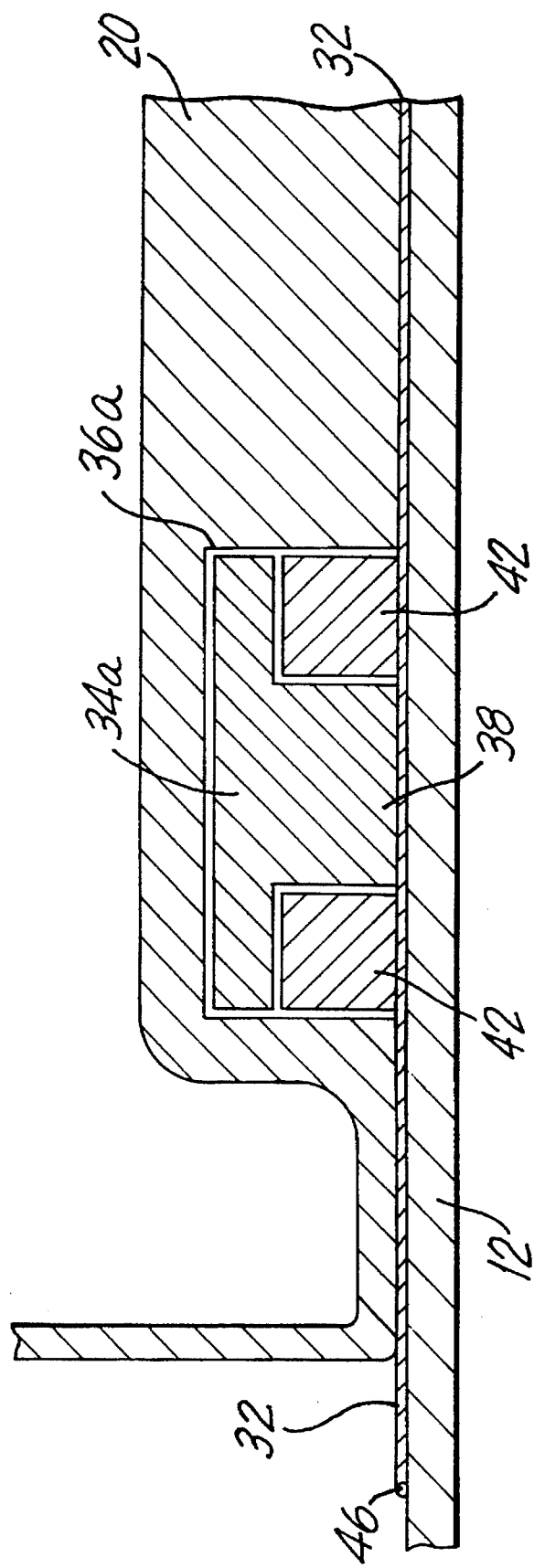
FIG. 2 is a detailed cross-sectional view of the portion of the isolation seal of the present invention depicted in circle A in FIG. 1.

Referring to FIGS. 1 and 2, the fluid storage tank 10 of the present invention is generally cylindrical in shape, has an outer wall 12 and is made of a rigid material such, for example, as AL 2219 in T6 or T8 temper, AL 6061 in T6 temper, Ti 6AL-4V, or stainless steel, that will resist corrosion over a period of years by the fluid to be stored. The exit end 14 of storage tank 10 is sealed by an exit end wall 16 that is also made of rigid, corrosion-resistant material and, in the present embodiment, is substantially planar in shape. An outlet tube 18 is mounted in exit end wall 16. A cylindrically shaped piston 20 is slidably mounted within storage tank 10. In the present embodiment, the central portion of the head 22 of piston 0 is substantially planar in shape to match the shape of exit end wall 16.

The inlet end 24 of storage tank 10 is sealed by an inlet end wall 26 which is made of a rigid, corrosion-resistant material. Through inlet end wall 26, there is defined an inlet tube 28. Pressurant chamber 30 is formed, within storage tank 10, by piston 20 and inlet end wall 26.

An isolation seal 32 is mounted within outer wall 12 of storage tank 10 between piston head 22 and exit end wall 16 to form a fluid tight storage chamber 40. The fluid to be stored, such as rocket propellant, is stored within fluid storage chamber 40. Isolation seal 32 is thin and is made of a relatively soft, in comparison to the tank wall material, metal like aluminum 1100-T0, commercially pure Titanium, or non precipitation hardened stainless steel.

Leading and trailing annular seal assemblies, 34a and 34b, are mounted within two circumferential seal recesses 36a and 36b, respectively, in piston 20. Circumferential seal recess 36b is proximate to piston head 22 while circumferential seal recess 36a is proximate to the end of piston 20 adjacent to pressurant chamber 30. Although a T-seal with backup rings is illustrated, other seal types such as O-rings or spring energized C-seals may also be utilized.

Each annular seal assembly, as assembly 34a shows, is preferably comprised of an annular T-seal 38 and two back-up rings 42. T-seal 38 and back-up rings 42 are both comprised of materials which do not rapidly degrade in the presence of the stored fluid. Additionally, T-seal 38 is made of material that remains resilient when exposed to the fluid stored in storage chamber 30. Preferably, T-seal 38 is comprised of a high modulus rubber such, for example, as ethylene propylene rubber, while back-up rings 42 are comprised of Teflon, most preferably virgin Teflon.

As best shown in FIG. 2, isolation seal 32 is attached by a circumferential weld 6 to the inner surface of outer wall 12 of storage tank 10. In accordance with the present invention, this weld is advantageously placed behind the dynamic seal assemblies 34a, 34b so as to avoid the risk of damage associated with passing over a weld. The circumferential weld 46 may be applied by Tungsten Arc Gas Welding (TAGN) or Electron Beam. Although isolation seal 32 is preferably attached to outer wall 12 by a weld, other means of attachment may be used, provided that the material comprising the attachment means does not corrode upon prolonged exposure to the fluid being stored, provided that it is impervious to the fluid, and provided that its structural integrity is greater than that of the isolation seal 32 at its circumferential notch 51 (discussed below in connection with FIGS. 3, 4A and 4B).

The shape of the central portion of isolation seal 32, which may be bonded to the piston head 22, preferably matches the shape piston head 22 so that it fits snugly thereagainst. Prior to assembly, the aft side piston head 22 is in fluid communication via port 53 with the isolation seal 32 so that when a vacuum is applied by a vacuum pump connected through port 53, the seal 32 and piston head 22 are joined together. Thus, when piston head 22 is substantially planar in shape, as shown in FIG. 1, the central portion of isolation seal 32 is also substantially planar in shape. Isolation seal 32 is also preferably attached by an adhesive to piston head 22. Isolation seal 32 thus provides a static seal to fluid storage chamber 40.

With particular reference now to FIGS. 3, 4A and 4B, it can be seen that isolation seal 32 has a circumferential score pattern 50 which encircles isolation seal 32. The score pattern 50 is of a depth so that isolation seal 32 will rupture along a circumferential notch 51 as pressure is applied to piston 20. As best seen in FIG. 4A, notch 51 may illustratively be configured with a wedge shaped recess near its forwardly facing, rear surface. This recess provides sufficient strain and stress amplification to ensure breaking of the seal at the desired location upon movement of the piston, as shown in FIG. 4B. The break or rupture of the isolation seal 32 is induced by a tensile overload of the notch zone rather than by shearing. This insures that the tank mounted (fixed) portion of the shear seal is not pulled away from the tank wall 12. Preferably, the circumferential score pattern 50 may be formed by placing the isolation seal 32 on a lathe and by pulling a machining tool (not shown) in toward the isolation seal 32 parallel to the lathe rotational axis thereby generating surface 52. As shown in FIG. 4A, this effectively cuts or machines a circumferential score pattern that is parallel to the outer diameter of the seal 32. Thereafter, notch 51 is cut into the base of the circumferential score pattern 50 to provide additional stress or strain amplification factor which is what ensures the breaking of the seal 32 at this location.

The inventive score pattern and notch configuration of FIGS. 4A and 4B provide several advantages over the prior art. As best seen in FIG. 5, the ruptured surface 32a faces down from the seal making surfaces of annular seal assembly 34b. As such, as the ruptured surfaces 32a and 32b are approximately 270 degrees away from the surface the dynamic seal rides on, the dynamic seals need not be making contact with the jagged edges of the ruptured isolation seal.

To further minimize the risk of damage to the isolation seals, the tank of the present invention utilizes a tapered bore configuration (region C of FIG. 1) which enables leading isolation seal 34b to form a tight fitting seal with tank wall 12 only after it has passed over the static portion of the ruptured isolation seal. For this purpose, the interior of the tank has a first or larger diameter section, which is bored to accept the isolation seal, a second or smaller diameter section, and a tapered transition section which is disposed therebetween just past the rupture zone of the isolation seal (prior to movement of the piston). Leading annular seal 34b does not establish tight fitting, sealing contact with the interior of the tank until just before it reaches the second diameter section. As is evident, the distance Y between the two dynamic seals 34a and 34b is greater than the distance X of the tapered transition section.

While seal 34b passes over the rupture zone, there will be insufficient bearing pressure between the seal 34b and the cylindrical wall 12 to provide a proper seal or support mechanisms for dynamic seal damage while passing over the rupture zone proximity. In accordance with the present invention, the trailing annular seal 34a is spaced sufficiently behind leading annular seal 34b to ensure that an interim seal is provided, by the interface between the trailing annular seal 34a and the remaining portion of the isolation seal, until leading annular seal 34b achieves sealing engagement with the cylindrical wall. As seal 34b progresses through the tapered transition region, the bearing pressure or squeeze rate increases. Accordingly, as the piston 20 is moved forward, the first seal, near the end of the transition region, comes into sufficiently hard contact with the outer wall to establish a dynamic seal with the cylindrical wall 12. When leading seal 34b has established an effective seal, the trailing seal 34a passes over the rupture region of the isolation seal 32 and at that point serves only as a guide ring as there is insufficient bearing pressure to effect a proper pressure seal. As such, it is contemplated that seal assemblies 34a and 34b serve not only as pressure seals, but also as guide rings or stabilizing rings for the piston as it travels toward the exit end wall of tank 10.

In operation, fluid is stored in storage chamber 40. A pressurant fluid is introduced into storage tank 10 through inlet tube 28. As a result, pressure builds up in pressurant chamber 30 against piston 20 and thus against isolation seal 32. The pressure exerted upon isolation seal 32 causes it to rupture along circumferential score 50 in notch 51. The dynamic seal provided by annular seal assembly 34a initially ensures that the stored fluid does not leak past piston 20 after isolation seal 32 has ruptured and while piston 20 is moving. As the piston continues to travel, annular assembly 34b travels over the rupture zone and into increasingly tight fitting contact with cylindrical wall 12 as it travels through the transition region and into the smaller diameter region.

Piston 20 slides within storage tank 10 thereby increases the pressure in storage chamber 40, urging the stored fluid to be expelled from storage tank 10 through outlet tube 18. Because piston head 22 and the central portion of isolation seal 32 have the same planar shape as end wall 16 of storage tank 10, when piston 20 has traveled the full length of storage chamber 10, substantially all of the propellant is expelled from storage chamber 40.

Figure 6:
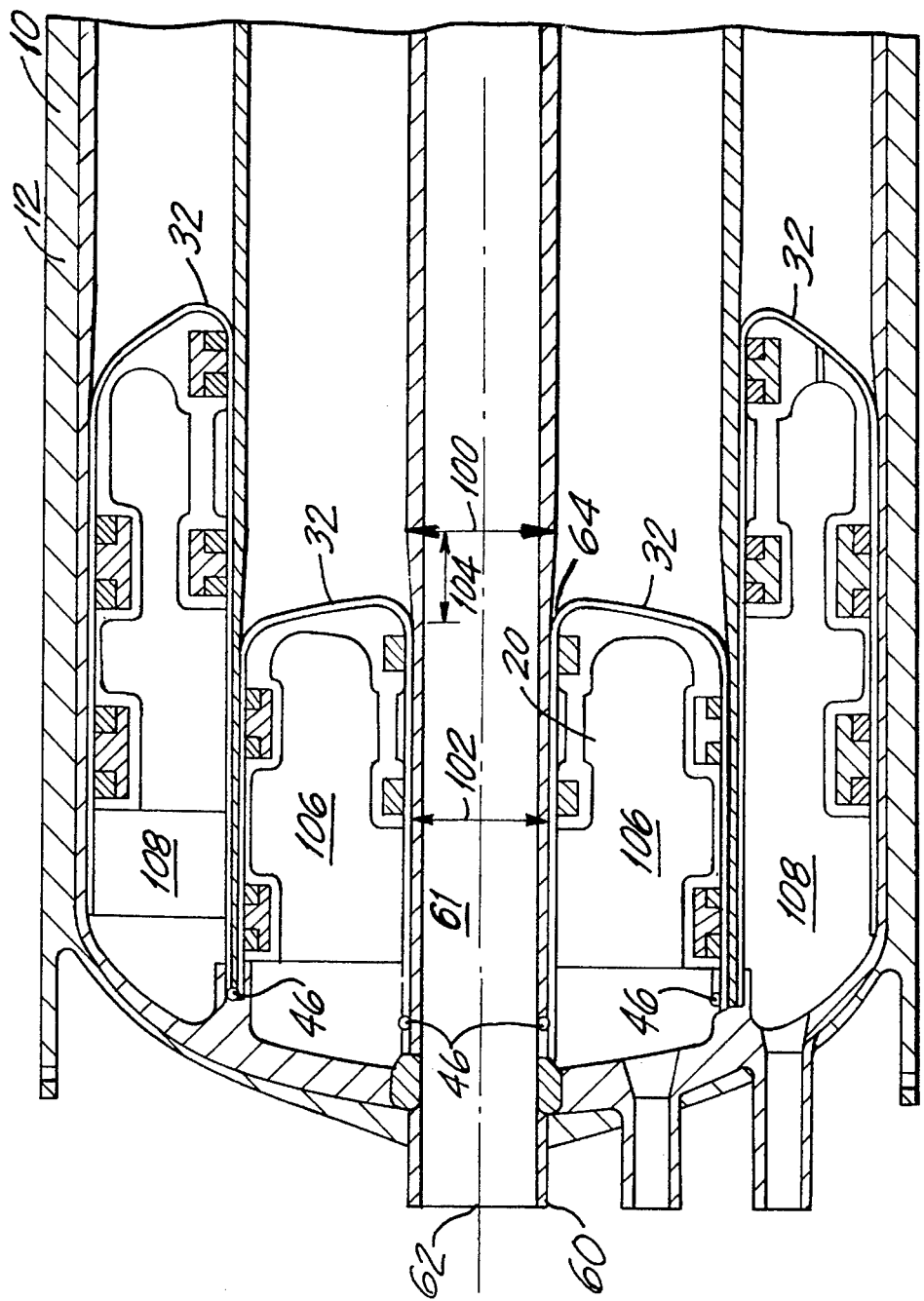
FIG. 6 is a schematic cross-sectional view of an alternative embodiment of the isolation seal of the present invention wherein a conduit tube passes through the isolation seal and piston.

FIG. 6 shows an alternative embodiment of the present invention having inner 106 and outer 108 pistons in which a conduit tube 60 passes through inner piston 106 and isolation seal 32. Conduit tube 60, circumscribes another volume 61 which may contain another fluid tube or serve as a wire channel. Aperture 62 provides access to volume 61 that passes through piston 20 and isolation seal 32 and provides direct communication to the other end of the tank. A first or larger diameter section 100, a second or smaller diameter section 102, and an intermediate diameter section 104 which provides a tapered transition therebetween provides for isolation seal installation and article function as previously described. Conduit tube 60 which circumscribes volume 61 may be used for transporting a fluid (a liquid, a gas, a gel, a suspension of solids, or a mixture of any one or more of these) to or from other components in the missile or rocket, and may serve as a wire conduit connecting remotely located sensors and/or controls. As to the other elements shown in FIG. 6, these elements are identical to those shown in FIGS. 1–5 except that additional sealing elements are present proximate to aperture 64 in piston 20, utilizing the geometry of the tapered conduit tube in the same manner as that of the tapered transition region of the cylindrical body 12.

Thus, while there have been shown and described and pointed out fundamental novel features of the invention as applied to preferred embodiments thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto.

For example, the shapes of various components may be changed. Storage tank 10, and thus piston 20 and isolation seal 32 may have a cross-sectional shape other than circular, such as, for example, elliptical, square or rectangular. Additionally, piston head 22, the central portion of isolation seal 32 and end wall 16 of storage tank 10 may be generally hemispherical or have an isotensoidal head profile.

Furthermore, although the invention has been described with reference to rocket propellant tanks, the fluid storage tank of the present invention can be used in connection with various other fluids (liquids, gases or mixtures of both), corrosive or not.

What is claimed is:

1. A cylindrical tank for storing fluid comprising:
   a cylindrical body forming a wall of the tank, said cylindrical body defining an interior cavity having a first diameter region, a second diameter region, and a transition region therebetween;
   an exit end wall fixedly attached to an exit end of said cylindrical body by a fluid tight seal;
   an inlet end wall fixedly attached to an inlet end of said cylindrical body by a fluid tight seal;
   a piston slidably disposed within said interior cavity between said exit end wall and said inlet end wall, said piston having a piston head and a circumferential side wall, said circumferential side wall having first and second circumferential recesses;
   leading and trailing annular seals mounted within said first and second circumferential seal recesses in said piston; and
   an isolation seal member mounted within said cylindrical tank between said piston and said cylindrical body, said isolation seal covering said piston head and said leading and trailing annular seals, said isolation seal member being fixedly attached by a fluid tight seal to the circumferential inner surface of said cylindrical body at a point between said trailing annular seal and said inlet end wall, wherein said isolation seal member forms a fluid tight storage chamber within said cylindrical body between said isolation seal member and said exit end wall.

2. The cylindrical tank of claim 1, wherein said isolation seal member defines a circumferential notch located proximate to an outer periphery of said isolation seal member, the circumferential notch reducing the thickness of said isolation seal member so that when said piston is pressurized said isolation seal member ruptures along said circumferential notch.

3. The cylindrical tank of claim 2, wherein the rupture of said isolation seal is induced by pressurization of said piston resulting in a tensile break of said circumferential notch.

4. The cylindrical tank of claim 1, wherein said transition region comprises a tapered portion of the cylindrical body.

5. The cylindrical tank of claim 1, wherein said isolation seal member is attached to said cylindrical body by a weld.

6. A cylindrical tank for storing fluid comprising:
   a cylindrical body forming a wall of the tank, said cylindrical body defining an interior cavity having a first diameter region, a second diameter region, and a transition region therebetween;
   an exit end wall fixedly attached to an exit end of said cylindrical body by a fluid tight seal;
   an inlet end wall fixedly attached to an inlet end of said cylindrical body by a fluid tight seal;
   a conduit tube having a tapered transition region between a first section having a first outer diameter and a second section having a second outer diameter greater than the first outer diameter;
   a piston slidably disposed within said interior cavity between said exit end wall and said inlet end wall, wherein said piston has an aperture passing therethrough in which said conduit tube is slidably mounted, and wherein said piston further comprises an annular conduit seal mounted on the piston so that said annular conduit seal tightly contacts the outer surface of the second section of said conduit tube to provide a fluid tight seal therebetween;
   an annular seal mounted on said piston so that said annular seal tightly contacts the inner surface of said cylindrical body in said second diameter region to provide a fluid tight seal between said piston and said cylindrical body; and
   an isolation seal member mounted within said cylindrical tank between said piston and said exit end wall and said cylindrical body, said isolation seal member being fixedly attached by a fluid tight seal to the inner surface of said cylindrical body at a point between said annular seal and said inlet end wall, wherein said isolation seal member forms a fluid tight storage chamber within said cylindrical body between said isolation seal member and said exit end wall, wherein said isolation seal defines an aperture aligned with the aperture of the piston for receiving said conduit tube, said isolation seal being fixedly attached by a fluid tight seal to the outer surface of said conduit tube at a location between said annular conduit seal and said inlet end wall.

7. The cylindrical tank of claim 6, wherein said isolation seal member defines a conduit circumferential notch located proximate to an inner periphery of the aperture in said isolation seal member, the conduit circumferential notch reducing the thickness of said isolation seal member so that when said piston is pressurized said isolation seal member ruptures along said conduit circumferential notch.

8. The cylindrical tank of claim 6, wherein said conduit tube defines a circumferential tube wall recess, said isolation seal being secured to said conduit tube within said circumferential tube recess.

9. The cylindrical tank of claim 6, wherein said isolation seal is fixedly attached to said piston.

10. The cylindrical tank of claim 6, wherein said isolation seal member is attached to said cylindrical body and said conduit tube by welds.

11. The cylindrical tank of claim 6, wherein a central portion of said isolation seal member has the same shape as a central portion of a surface of said piston adjacent to said isolation seal member.

12. The cylindrical tank of claim 11, wherein the central portion of said isolation seal member and the central portion of said piston are substantially elliptical.

* * * * *